Figure 1:
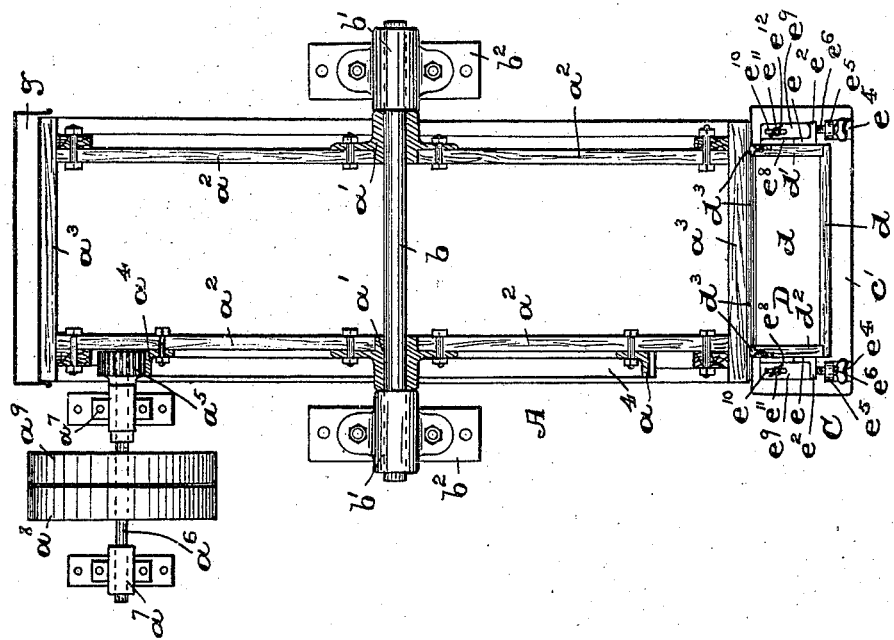

No. 704,977. Patented July 15, 1902.
P. B. TAYLOR.
APPARATUS FOR DESICCATING EGGS.
(Application filed Nov. 8, 1899.)

(No Model.) 4 Sheets—Sheet 1.

WITNESSES:
Marcy Z. Trusdell
Harry Martin

INVENTOR:
PERCY B. TAYLOR,
BY
Fred C. Fraentzel,
ATTORNEY

No. 704,977. Patented July 15, 1902.
P. B. TAYLOR.
APPARATUS FOR DESICCATING EGGS.
(Application filed Nov. 8, 1899.)
(No Model.) 4 Sheets—Sheet 2.
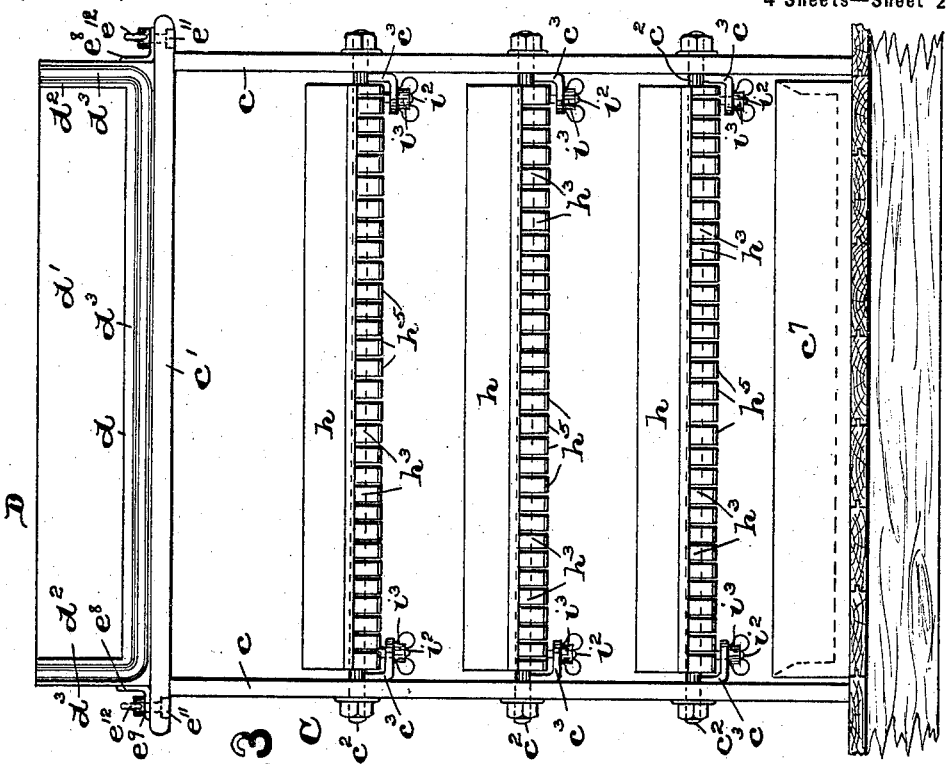
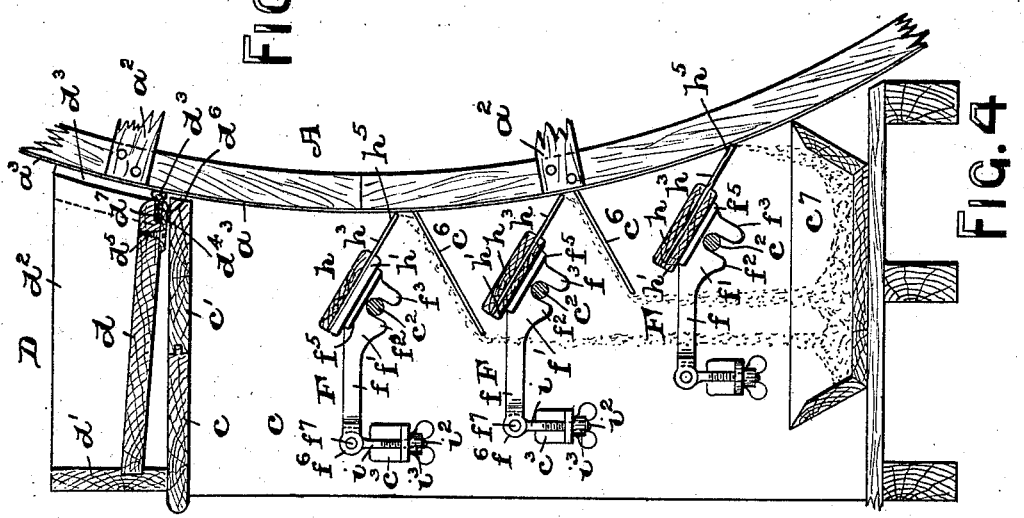
WITNESSES:
INVENTOR:
PERCY B.TAYLOR,
BY
ATTORNEY No. 704,977. Patented July 15, 1902.
P. B. TAYLOR.
APPARATUS FOR DESICCATING EGGS.
(Application filed Nov. 8, 1899.)
(No Model.) 4 Sheets—Sheet 3.

WITNESSES:
Narcy F. Trusdell
Harry Martin

INVENTOR:
PERCY B. TAYLOR,
BY
Fred'k C. Fraentzel,
ATTORNEYS

THE NORRIS PETERS CO., PHOTO-LITHO., WASHINGTON, D. C.

No. 704,977. Patented July 15, 1902.
P. B. TAYLOR.
APPARATUS FOR DESICCATING EGGS.
(Application filed Nov. 8, 1899.)
(No Model.) 4 Sheets—Sheet 4.
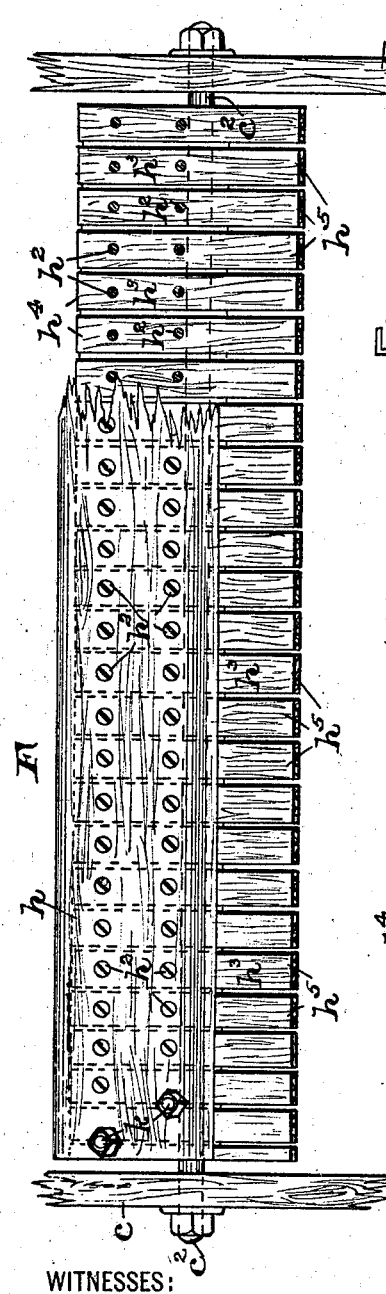
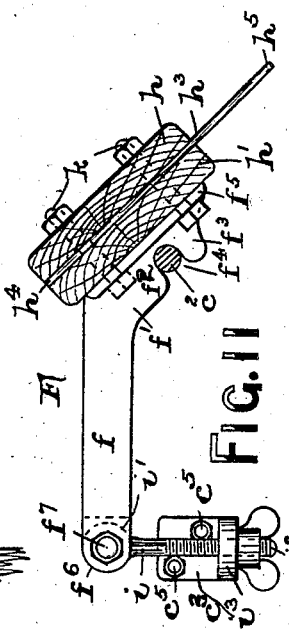
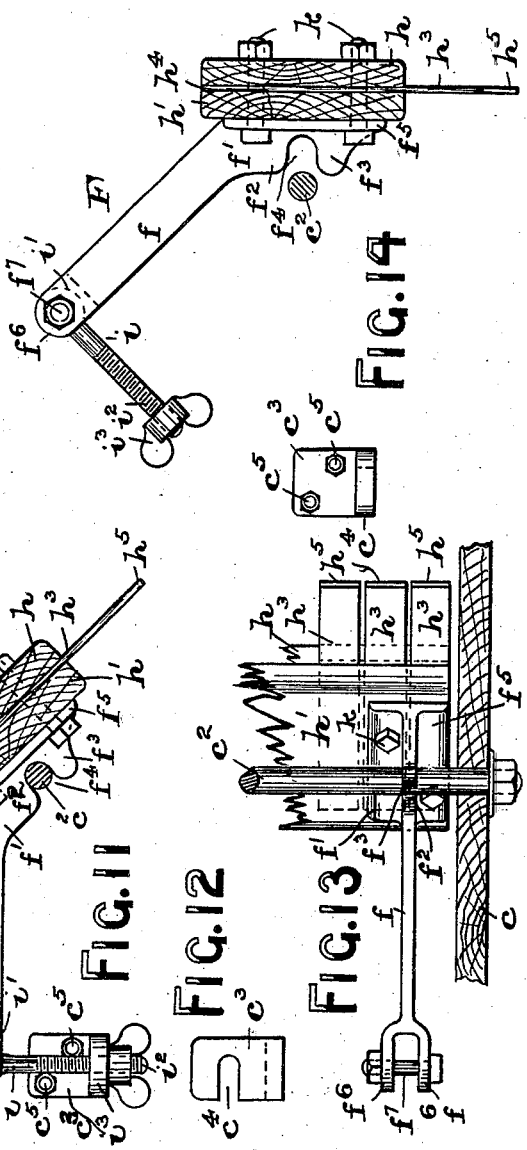
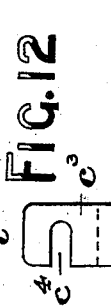
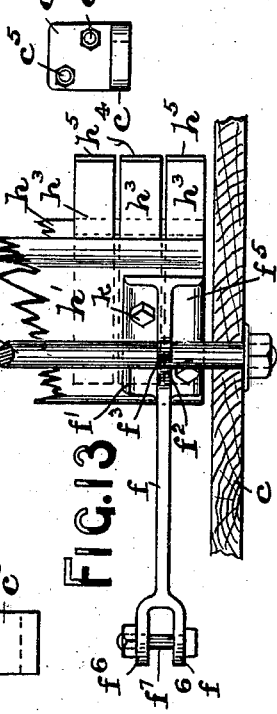
WITNESSES:
Marcy J. Trusdell
Harry Martin
INVENTOR:
PERCY B. TAYLOR,
BY Fred C. Fraentzel,
ATTORNEY

UNITED STATES PATENT OFFICE.

PERCY B. TAYLOR, OF NEWARK, NEW JERSEY, ASSIGNOR TO THE PURE FOOD COMPANY, A CORPORATION OF NEW JERSEY.

APPARATUS FOR DESICCATING EGGS.

SPECIFICATION forming part of Letters Patent No. 704,977, dated July 15, 1902.

Application filed November 8, 1899. Serial No. 736,244. (No model.)

*To all whom it may concern:*

Be it known that I, PERCY B. TAYLOR, a citizen of the United States, residing at Newark, in the county of Essex and State of New Jersey, have invented certain new and useful Improvements in Apparatus for Desiccating Eggs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates generally to improvements in apparatus for the desiccation of eggs or other materials, and more especially to the novel construction and arrangement of a rotating drum or wheel, to the surface of which the egg-batter or other material for desiccation is applied in the viscid or glutinous state in an approximately even and unbroken film or sheet, combined with a scraping means for removing the dried and desiccated egg or other material from the surface of the said drum, wheel, or other equivalent means in the form of flakes or a powder into a tray.

The main object of this invention, therefore, is to provide a novel means for removing the dried and desiccated material from the surface of the drum or wheel or other device in its manufactured condition ready for future use and for storage without deterioration.

My invention therefore consists in the novel construction of scraping device taken singly or collectively, with a rotating drum or wheel and its parts, as will be hereinafter more fully set forth in detail; and the invention also consists in such other novel arrangements and combinations of parts, as well as the details of the construction thereof, all of which will be described in the accompanying specification, and finally embodied in the clauses of the claim.

The invention is clearly illustrated in the accompanying drawings, in which—

Figure 2:
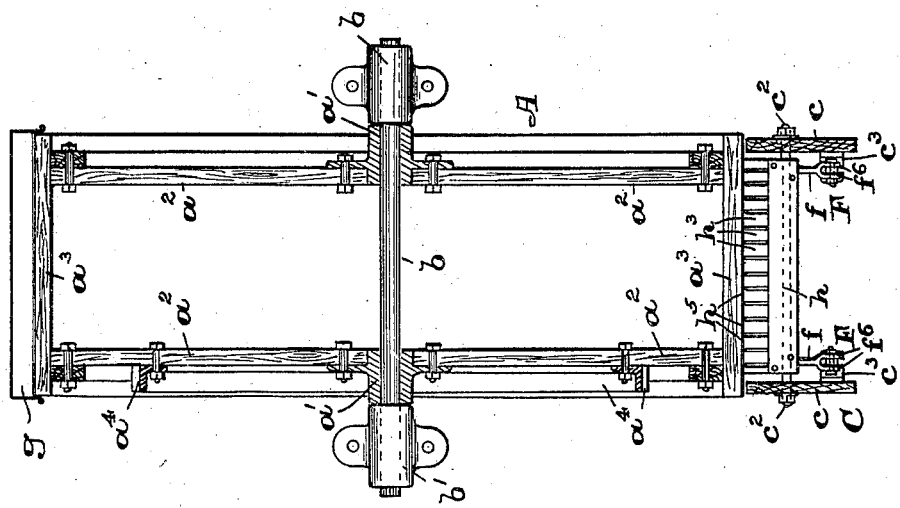
Figure 5:
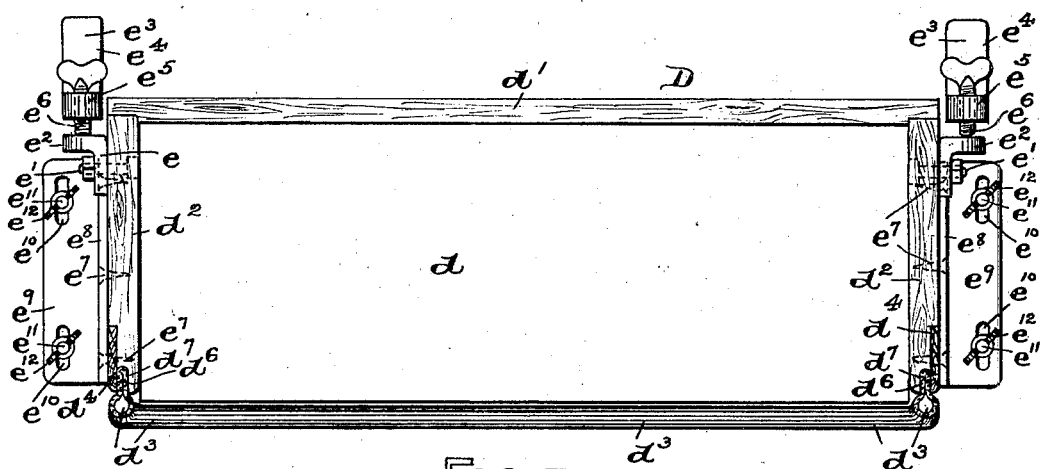
Figures 6, 7:
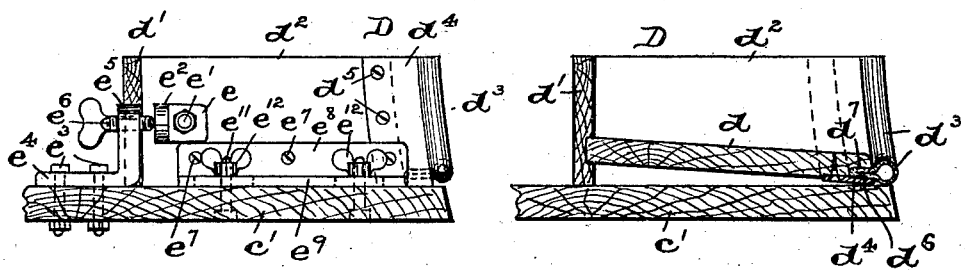
Figure 8:
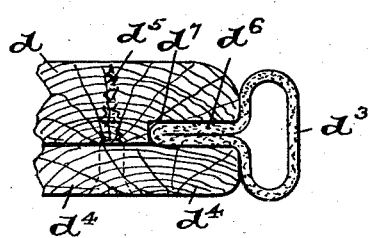
Figure 9:
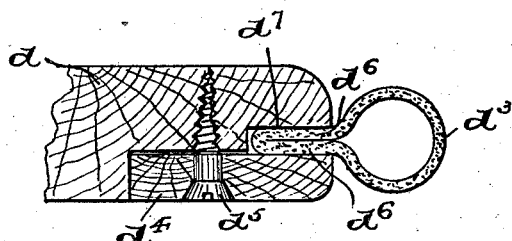

Figure 1 is a horizontal section of a drying drum or wheel, illustrating in connection therewith one means for driving the same and the application to its drying-surface of a coating-tray; and Fig. 2 is a cross-section of the said drum or wheel, said section being taken just below said tray and illustrating in connection with the said drum or wheel, in plan or top view, one arrangement of my novel form of scraping device. Fig. 3 is a front elevation of a framework in which the coating-tray and scraping device are arranged, showing the same detached from the drum or wheel; and Fig. 4 is a vertical section of a portion of the said drum or wheel and the frame with the coating-tray and a scraper or scrapers in their operative positions with the drying-surface of the drum. Fig. 5 is a top view, on an enlarged scale, of the coating-tray. Fig. 6 is an end elevation, and Fig. 7 is a vertical cross-section of the same. Fig. 8 is a detail section of a portion of the tray and contact-strip shown in the shape that it assumes when the tray is forced up against the drying-surface of the drum or wheel, and Fig. 9 is a similar view of the said parts with the said rubber contact-strip under normal conditions. Fig. 10 is an enlarged top or plan view of scraping device, illustrating its general construction and method of fastening certain hard-wood scraping-fingers in place. Fig. 11 is a vertical cross-section of scraper in its operative position, illustrating one means of pressure-regulator. Fig. 12 is a bottom view of one form of lug to be used in connection with said pressure-regulating device. Fig. 13 is a bottom view of one end of said scraping device; and Fig. 14 is a vertical cross-section of the said scraping device, with the regulating device disconnected from said lug and the remaining parts represented in position to be removed from the framework indicated in said Figs. 3 and 4.

Similar letters of reference are employed in all of the said above-described views to indicate corresponding parts.

In said drawings, A indicates a suitably-constructed drum or wheel comprising the hub $a'$ and spokes $a^2$, to which is secured in any desired manner a suitable cylindrical body $a^3$, which forms a drying-surface and onto which the material to be desiccated is to be applied in the manner hereinafter described. The said wheel is preferably made of wood; but other material may be employed, and it may be otherwise constructed, being supported on a shaft $b$, which is rotatively arranged in the bearings $b'$ of suitable pedestals $b^2$, as will be clearly understood.

Any suitable driving means may be employed for rotating the drum or wheel A, the preferred mechanism being a toothed ring $a^4$, which is arranged on one side of the drum or wheel, as shown in Figs. 1 and 2, and a pinion $a^5$ geared with the same, said pinion $a^5$ being secured on a shaft $a^6$, rotating in bearings $a^7$ and having a loose pulley $a^8$ and fast pulley $a^9$ for actuating the same.

As will be noticed more particularly from Figs. 1, 2, and 4, I have arranged at one side of the cylindrical body $a^3$ a frame C, which consists, essentially, of two side pieces or supports $c$ and a top $c'$ for the placing thereon of a coating-tray D. The said tray, which consists, essentially, of an inclined bottom $d$, a back $d'$, and sides $d^2$, being open at the top and front, is adjustable toward or from the face of the cylindrical body $a^3$ of the drum or wheel A for the compression of a rubber or other suitable contact-strip $d^3$ against said body $a^3$ to prevent any loss of the egg-batter or other material at the sides and bottom of the said tray D. The said strips $d^3$, which are preferably tubular in cross-section, substantially as shown, are secured to the edges of the bottom $d$ and the sides $d^2$ by means of a plate or piece $d^4$, which is secured to the said bottom or sides by means of the screws $d^5$ or in any well-known manner and causes a portion $d^6$ of each flexible strip or tubing $d^3$ to become firmly wedged in a recess or cutaway part $d^7$ in each side $d^2$ and the bottom between the surface $d^8$ and the plate or piece $d^4$, substantially as illustrated in Figs. 8 and 9.

In order that the coating-tray may be adjustable to or from the face of the cylindrical body $a^3$ of the drum or wheel $d$, I have secured to the outer surface of each side $d^2$ of the tray, by means of a bolt or screw $e'$ or in any other well-known manner, the brackets or plates $e$, each plate having a shoulder or portion $e^2$ extending at a right angle, or approximately so, from the body of each plate $e$, and firmly secured upon the top $c'$ of the table or frame C, by means of the bolts or screws $e^3$, are a pair of brackets or plates $e^4$, on each of which is an upwardly-extending arm or lug $e^5$, having a screw-threaded hole for the reception of suitable adjusting screws or bolts $e^6$, which can be screwed up against the shoulders or portions $e^2$ of the plates $e$, above mentioned. Also secured against the outer faces of the sides $d^2$ of the tray D, by means of screws $e^7$ or in any other well-known manner, are guide-plates $e^8$, each plate $e^8$ having a right-angled portion $e^9$, provided with slots $e^{10}$ or the equivalent thereof, whereby said plates $e^8$ are slidably arranged over certain studs or pins $e^{11}$ in the top $c'$ of the frame C and can be held in place by means of suitable thumb-pieces $e^{12}$, and when slightly unscrewed by screwing up the adjusting screws or bolts $e^6$ the tray D can be easily forced in a direction toward the face of the body $a^3$ of the drum or wheel A to compress the contact-strips $d^3$ and cause the free edges of the bottom and sides of the tray to close up against the moving surface of said body $a^3$ of the revolving drum or wheel A, and thereby producing a batter-receiving receptacle from which the batter or other material is readily applied in a thin and even coating upon the surface of the drum or wheel A, upon which surface the material is thoroughly dried by the extraction of all moisture when a current of dry and heated air is forced around said part $a^3$ of the drum or wheel A through an air-box $g$, which embraces the greater portion of said drum or wheel. After the material has been properly desiccated it hardens on the surface of the body $a^3$ of the drum or wheel A and is finally removed in its finished state, ready for future use, by means of a suitably-constructed scraping device placed in said framework C directly beneath the coating-tray D. The arrangement and construction of said scraping mechanism is clearly illustrated in Figs. 2, 3, 4, 10, 11, 12, 13, and 14 of the accompanying drawings. One or more of said scraping devices may be employed, an arrangement of three scraping devices being shown in the present case.

As shown in the several figures of the drawings, the frame or support C has one or more rods $c^2$ extending laterally across said frame, with the opposite ends of said rod or rods secured in or to the side pieces $c$ of said frame or support C. Pivotally and removably arranged on each rod $c^2$ is a suitably-constructed scraping device F. Each scraping device F consists, essentially, of a pair of arms $f$, each arm having a downwardly-extending and angularly-arranged portion $f'$, provided with the parts $f^2$ and $f^3$, having an open part or slot $f^4$ between them. Connected with the angular portions $f'$ of said arms $f$ in any well-known manner is a brace $f^5$, which is provided with holes for the reception of suitable bolts $k$ for securing upon said brace $f^5$ a pair of top pieces $h$ and $h'$ of any suitable material, but preferably of wood. Secured between these two pieces $h$ and $h'$ by means of screws $h^2$ are the ends $h^4$ of a number of spring fingers or blades $h^3$, which are made of a thin material of great elasticity, preferably hickory; but it will be understood that said fingers or blades $h^3$ may be of any other wood suitable for the purposes for which they are intended, or said fingers or blades may be of metal, if found desirable. Each arm $f$ hereinabove mentioned has a bifurcated and perforated end $f^6$ and a pin or bolt $f^7$, on which is pivoted the eye portion $i'$ of an eyebolt $i$. Each eyebolt has a screw-threaded portion $i^2$ and a thumb or other suitable nut $i^3$, which screw end $i^2$ can be swung into a slot $c^4$ in a plate or bracket $c^3$, (see Figs. 11 and 12,) said plates or brackets $c^3$ being suitably secured by means of bolts or screws $c^5$ to the inner surfaces of the sides $c'$ of the frame or support C, substantially as illustrated in Figs. 3 and 4 of the drawings. Thus it will be seen that when it is desired to have the ends $h^5$ of the spring fingers or blades $h^3$ bear firmly against the moving surface of the body $a^3$ of the drum or wheel A to scrape off therefrom the dried material which falls on suitably-arranged baffle-plates $c^6$, connected with the frame or support C, into a receiving tray or box $c^7$, the said thumb-nuts $i^3$ are screwed upon the screw end $i^2$ of each eyebolt $i$ and against the plate $c^3$, thereby causing a downward pull on said rods or arms $f$ and swinging the plate or bar $f^5$, the pieces $h$ and $h'$, and the spring fingers or blades $h^3$ on their pivotal support to regulate the pressure exerted by the scraping ends of the said fingers or blades $h^3$ against the surface of the body $a^3$ of the drum or wheel A. By the construction and arrangement of these several parts of the scraping device it will also be evident that the device can be easily and quickly removed from the frame or support C for repairing purposes or for cleansing the scraping-blades whenever necessary.

When two or more scraping devices are to be employed, the spring fingers or blades $h^3$ are staggered or arranged in such a manner so as to break joints, as will be clearly evident from an inspection of Fig. 3 of the drawings, thereby insuring the entire removal of all the dried material adhering to the moving surface of the body $a^3$ of the drum or wheel, as will be clearly understood.

Of course I am aware that changes may be made in the various arrangements and combinations of the several devices herein set forth, as well as in the details of the construction of such devices, without departing from the scope of my present invention. Hence I do not limit my invention to the exact arrangements and combinations of the various devices as herein described and illustrated, nor do I confine myself to the exact details of the construction of such devices.

Having thus described my invention, what I claim is—

1. In an apparatus for the desiccation of eggs, or other substances, the combination, with a drying drum or wheel, and means for actuating the same, of a frame or support, and a pivotally-arranged scraping device or devices in said frame or support, consisting, essentially of a pair of arms $f$, each arm having an angular portion $f'$ and an open part or slot $f^4$ for pivotally arranging said scraping device or devices on a support in said frame, a pair of top pieces connected with said portions $f'$, and spring fingers or blades between said top pieces in operative contact with the drying-surface of said drum or wheel, and means connected with said device or devices for regulating the pressure of said spring fingers or blades against said drying-surface, substantially as and for the purposes set forth.

2. In an apparatus for the desiccation of eggs, or other substances, the combination, with a drying drum or wheel, and means for actuating the same, of a frame or support, and a pivotally-arranged scraping device or devices in said frame or support, consisting, essentially of a pair of arms $f$, each arm having an angular portion $f'$ and an open part or slot $f^4$ for pivotally arranging said scraping device or devices on a support in said frame, a pair of top pieces connected with said portions $f'$, and spring fingers or blades between said top pieces in operative contact with the drying-surface of said drum or wheel, and means connected with said device or devices for regulating the pressure of said spring fingers or blades against said drying-surface, consisting, of plates or brackets attached to the sides of said frame or support, and a screw connection between said plates or brackets and the said arms $f$ of the scraping device or devices, substantially as and for the purposes set forth.

3. In an apparatus for the desiccation of eggs, or other substances, the combination, with a drying drum or wheel, and means for actuating the same, of a frame or support C, and baffle-plates $c^6$ in said support, a scraping device or devices in said support, and spring-fingers on said scraping device or devices in operative contact with the drying-surface of said wheel or drum, substantially as and for the purposes set forth.

4. In an apparatus for the desiccation of eggs, or other substances, the combination, with a drying drum or wheel, and means for actuating the same, of a main frame or support, a pair of side pieces to said frame or support, a supporting-rod extending from side to side in said frame or support, and a scraping device on said supporting-rod, consisting, essentially, of a pair of arms provided with means for pivotally supporting said arms on said supporting-rod, a brace at the end of each arm, a pair of top pieces secured to said braces, and a number of spring-fingers secured between said top pieces, in such a manner, that intervening spaces will be formed between the adjacent fingers, and means connected with said arms for regulating the pressure of said spring-fingers against the surface of said drying drum or wheel, consisting, of brackets $c^3$ secured to the inner surfaces of the side pieces of the main frame or support, each bracket having a slotted portion, and an eyebolt connected with one end of each of said brace-carrying arms, said eyebolts being removably arranged in the slotted portions of said brackets $c^3$, and a thumb-screw on each eyebolt, all arranged, substantially as and for the purposes set forth.

In testimony that I claim the invention set forth above I have hereunto set my hand this 3d day of November, 1899.

PERCY B. TAYLOR.

Witnesses:
FREDK. C. FRAENTZEL,
HARRY MARTIN.